(12) United States Patent
Akiyama et al.

(10) Patent No.: US 6,592,239 B1
(45) Date of Patent: Jul. 15, 2003

(54) VEHICULAR LAMP AND METHOD FOR PRODUCING SAME

(75) Inventors: Kazuo Akiyama, Shizuoka (JP); Fujihiko Sugiyama, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/548,361

(22) Filed: Apr. 12, 2000

(30) Foreign Application Priority Data

Apr. 12, 1999 (JP) .......................................... 11-103571

(51) Int. Cl.[7] .............................................. F21V 29/00
(52) U.S. Cl. ........................ 362/267; 362/507; 362/310; 362/509; 156/272.8
(58) Field of Search ................................. 362/267, 520, 362/546, 549, 516, 310, 306, 308, 507; 264/46.5, 238, 252; 427/282; 428/55; 156/272.8

(56) References Cited

U.S. PATENT DOCUMENTS

| 4,601,927 A | * | 7/1986 | Durfee | 156/292 |
| 4,654,760 A | * | 3/1987 | Matheson et al. | 362/267 |
| 5,556,584 A | * | 9/1996 | Yamazaki et al. | 264/238 |
| 5,560,706 A | * | 10/1996 | Yamazaki et al. | 362/549 |
| 5,893,959 A | * | 4/1999 | Muellich | 156/272.8 |
| 5,934,799 A | * | 8/1999 | Suzuki et al. | 362/507 |
| 6,089,731 A | * | 7/2000 | Sugiyama et al. | 362/267 |
| 6,217,202 B1 | * | 4/2001 | Kageyama et al. | 362/267 |
| 6,241,836 B1 | * | 6/2001 | Skirha et al. | 156/292 |

FOREIGN PATENT DOCUMENTS

| DE | 19814298 A1 | * | 10/1999 | .......... B29C/65/16 |
| JP | 11-348132 | * | 12/1999 | |

* cited by examiner

Primary Examiner—Sandra O'Shea
Assistant Examiner—Ali Alavi
(74) Attorney, Agent, or Firm—Sughrue Mion, PLLC

(57) ABSTRACT

A vehicular lamp with improved appearance quality (i.e., having no burrs or the like) around the joint interface between a front lens and a lamp body, and sufficient joint strength even in regions where the joint interface shape changes three dimensionally. A sealing leg, formed on the front lens, has a tip face which abuts and is joined by laser welding to a receiving face formed on the lamp body. To carry out the welding operation, a laser beam is irradiated from the front side of the front lens to the receiving face through the sealing leg. Therefore, even if the laser beam enters diagonally, it can be reflected internally by both side faces of the sealing leg so that the beam reliably reaches the tip face. As a result, the energy of the laser beam is not reduced, making it possible to efficiently heat the lamp body.

8 Claims, 7 Drawing Sheets

FIG. 5 - (a)
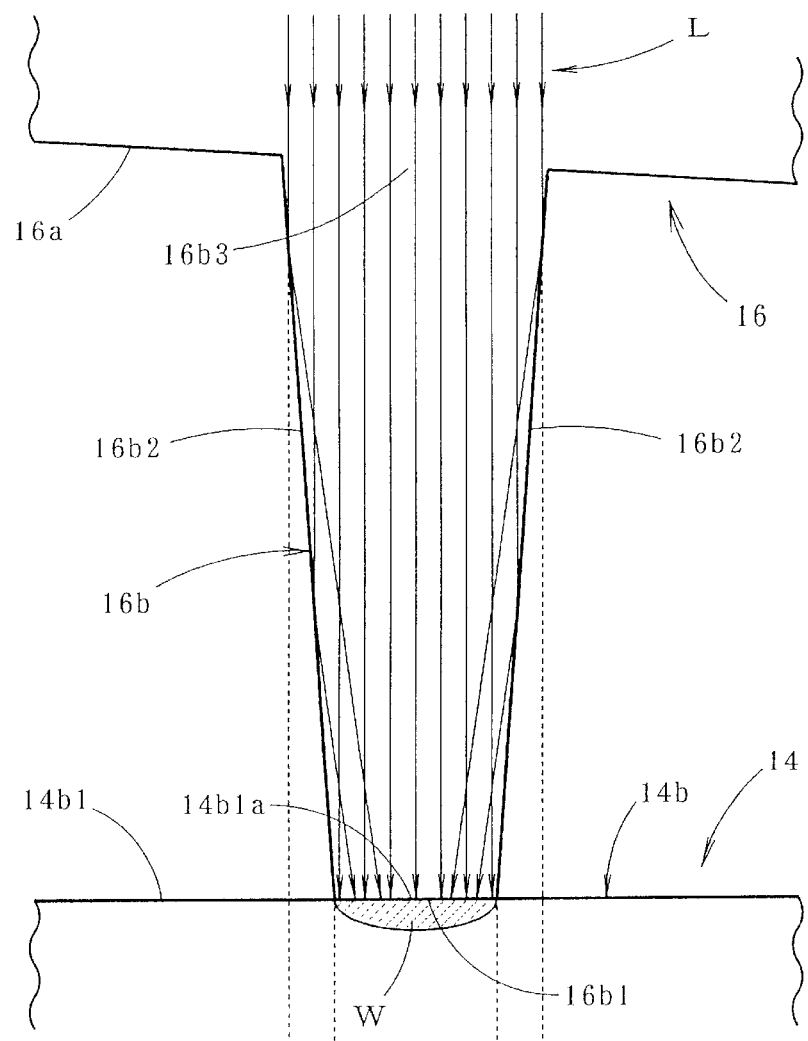
FIG. 5 - (b)
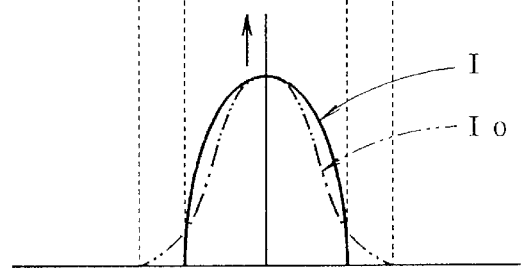

FIG. 7 - (a)
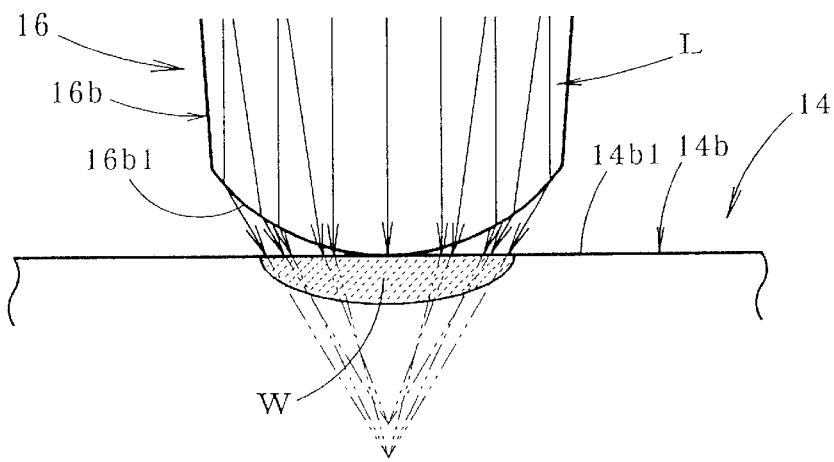
FIG. 7 - (b)
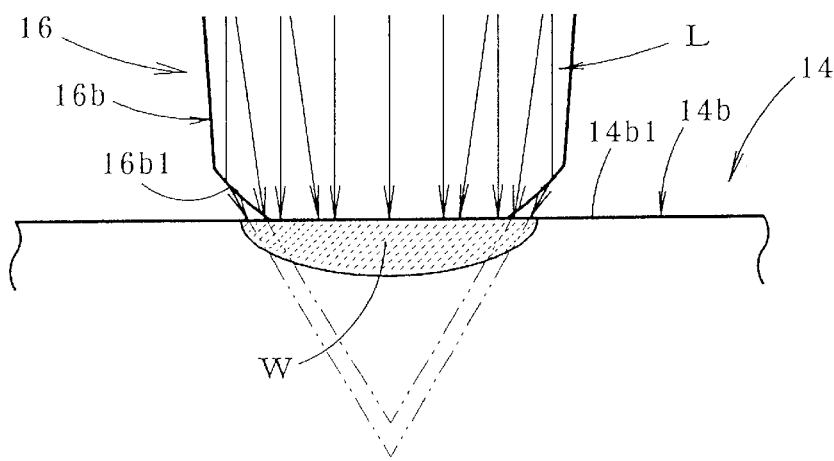
FIG. 7 - (c)
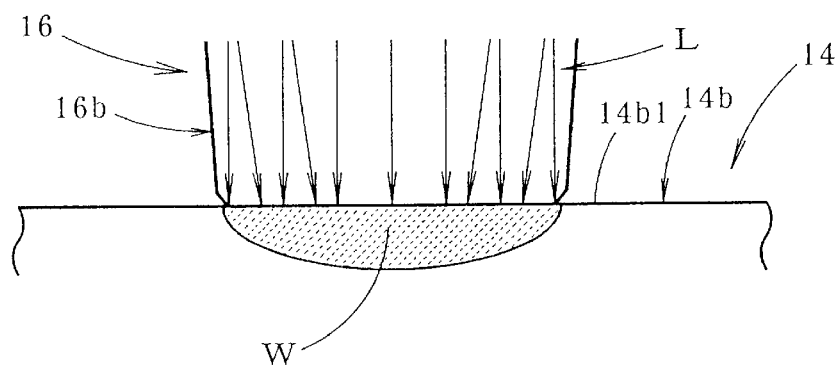

FIG. 8 - (a)
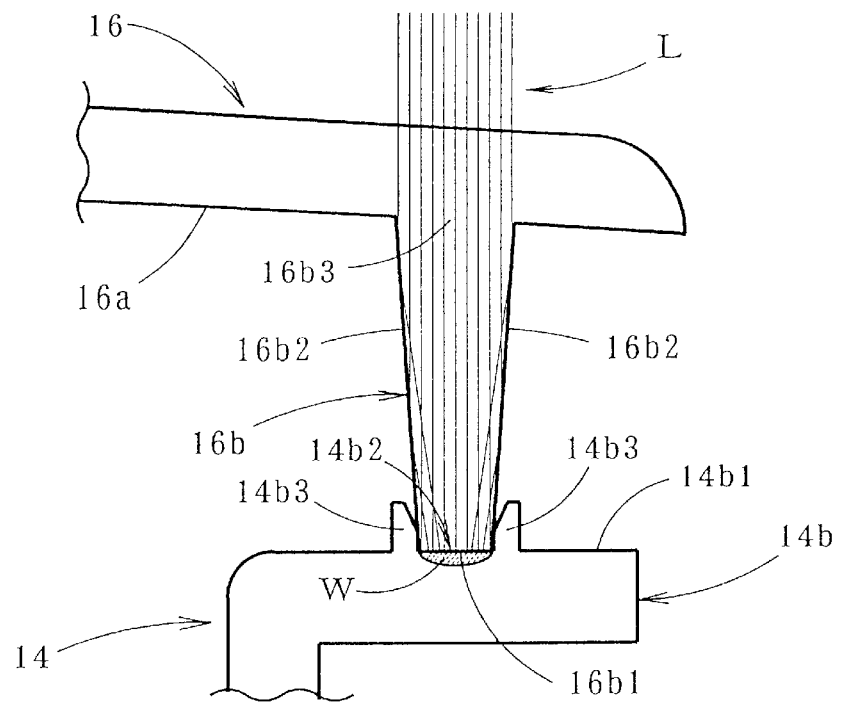
FIG. 8 - (b)
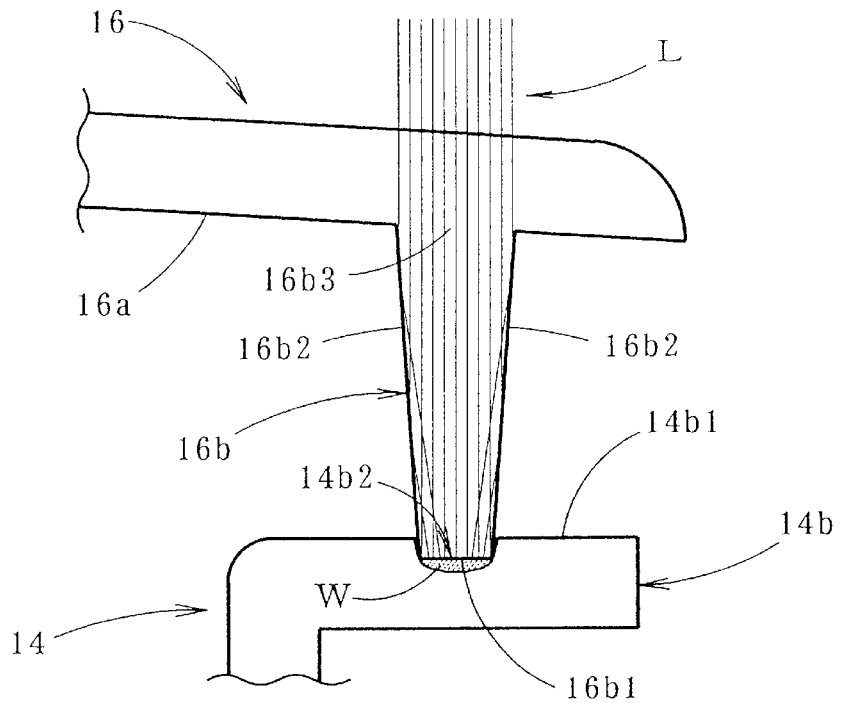

VEHICULAR LAMP AND METHOD FOR PRODUCING SAME

BACKGROUND OF THE INVENTION

The present invention relates to a lamp for motor vehicles constructed by joining a front lens and a lamp body, and to a s method for producing such a lamp.

Many vehicular lamps are constructed by joining a front lens and a lamp body. Conventional joining methods having included indirect joining in which the joining is done via a seal member and direct joining in which the joining is done by abutting the front lens directly to the lamp body. As a specific method for indirect joining, hot melt sealing or the like is well known, and as a specific method for direct joining, heating plate welding, vibration welding, and ultrasonic welding are well known.

For indirect joining, additional costs are incurred for the is sealing member, and a relatively large groove needs to be formed for applying the sealing member. Further, the need arises for a decorative treatment to make the sealing member in the groove difficult to see from the outside of the lamp.

Direct joining can solve the aforementioned problems arising from the presence of the sealing member. However, conventional direct joining has problems as will now be explained.

Heating plate welding generates protruding weld portions, so-called "foam burrs", on both sides of the joint interface, which degrades the outward appearance of the lamp. Vibration welding also generates relatively large burrs on both sides of the joint interface, thereby again degrading the appearance of the lamp. Further, in ultrasonic welding, in areas where the shape of the joint interface of the front lens and the lamp body changes three dimensionally and the curvature thereof becomes large, joining becomes impossible or difficult such that a problem arises in that sufficient joint strength cannot be obtained.

SUMMARY OF THE INVENTION

In view of the foregoing problems, the present invention has been made.

It is an object of the present invention to provide a vehicular lamp constructed by joining a front lens and a lamp body having an improved appearance around the joint interface and sufficient joint strength, even in regions where the shape of the joint interface changes three-dimensionally.

The present invention achieves the aforementioned and other objects by providing an improved structure for the joint portion of the front lens and the lamp body, and a joining method employing the same.

That is, the present invention provides a vehicular lamp in which the front lens and the lamp body are joined together, wherein a sealing leg is formed on the front lens and a receiving face against which a tip face of the sealing leg abuts is formed on the lamp body, and a tip face of the sealing leg and the receiving face are joined by laser welding.

The aforementioned "laser welding" means a joining method whereby a laser beam penetrable member and a laser beam impenetrable member are welded together by heating the laser beam impenetrable member by irradiating a laser beam on the abutting face of both members through the laser beam penetrable member in a state where the laser beam penetrable member which can be penetrated by a laser beam is abutted against the laser beam impenetrable member. The type of laser used for such laser welding is not particularly limited. For example, a semiconductor laser, a YAG laser or the like can be used.

The material for the aforementioned lamp body is not particularly limited as long as the material cannot be penetrated by a laser beam but instead heats up and melts upon irradiation by a laser beam. It is preferable to enhance the laser beam absorption ability of the lamp body as much as possible by adding an auxiliary material such as carbon black in order to perform more efficient laser welding.

The materials for the aforementioned front lens are not particularly limited as long as they can be penetrated by visible light and a laser beam and can be fixed to said lamp body by the melting thereof.

As illustrated in the aforementioned structure, in the vehicular lamp according to the present invention, a sealing leg is formed on the front lens and a receiving face to which the tip face of the sealing leg extends is formed on the lamp body, and the tip face of the sealing leg and the receiving face are joined by laser welding. The following effects thereby can be obtained.

Employing laser welding enables joining without generating large burrs or the like on the sides of the joint interface. Also, by employing laser welding, even in regions where the shape of the joint interface of the front lens and the lamp body changes three-dimensionally, because the laser beam only reaches the joint interface the joining operation can be carried out without difficulty, thereby ensuring a sufficient joint strength.

In addition, in accordance with the present invention, because the abutting portion of the tip face of the sealing leg and the receiving face defines the joint interface, the laser beam can be irradiated to the abutting portion from the front side of the front lens through the sealing leg. Therefore, even if the laser beam enters from a diagonal direction to some extent relative to the front lens, it is reflected internally by both side faces of the sealing leg and is able to reliably reach the tip face of the sealing leg such that the lamp body is able to be efficiently heated without reduction of the energy of the laser beam.

Therefore, in a lamp in which the front lens and the lamp body are joined according to the present invention, the appearance quality around the joint interface is improved and sufficient joint strength is ensured, even if the shape of the joint interface changes three-dimensionally.

In the aforementioned structure, by forming both side faces of the sealing leg in a tapered shape, part of the laser beam that has entered the front lens is able to reach the tip face of the sealing leg an increase in energy density by internally reflecting (i.e., totally reflecting) off both side faces of the sealing leg. Accordingly, the lamp body can be heated with even greater efficiency. In addition, forming of both side faces of the sealing leg in a tapered shape allows the base end portion of the sealing leg to be made wider, even if the tip face of the sealing leg is small, which facilitates irradiation of the laser beam into the sealing leg.

In this case, a "tapered shape" means that both side faces of the sealing leg narrow from the base end portion toward the tip face of the sealing leg at an angle (for instance, approximately 2 to 6°) that is greater to some extent than a draft angle (usually approximately 1.5°) employed when molding the front lens.

Also in the aforementioned structure, providing a positioning groove in the receiving face of the lamp body for preventing displacement of the sealing leg allows the laser welding to be performed while the front lens and the lamp body is are maintained in a predetermined physical relationship. Further, even if some burrs are generated due to laser welding, the burrs can be confined to the positioning groove, thereby providing a superior appearance quality around the joint interface. The positioning groove does not need to be as large as the groove needed for applying a seal member as required in the aforementioned indirect joining technique, thus eliminating the risk of degrading the appearance quality around the joint interface due to the presence of the positioning groove.

Further in accordance with the invention, employing a front lens in which the tip face of the sealing leg thereof is formed so as to have a convex lens shape allows, during laser welding, the laser beam which has penetrated the sealing leg and reached the tip face thereof to be emitted toward the receiving face as a focused beam, thereby enabling even more efficient heating of the lamp body.

BRIEF DESCRIPTION OF THE DRAWINGS

FIG. 5 is a further enlarged view of FIG. 4.

FIG. 7 is a sectional view of essential portions showing a modified example of the tip face of the sealing leg of the front lens for the aforementioned vehicular lamp.

FIG. 8 is a sectional view of essential portions showing a modified example of the receiving face of the lamp body for the aforementioned vehicular lamp.

DESCRIPTION OF THE PREFERRED EMBODIMENTS

Preferred embodiments of the present invention will hereinafter be described with reference to the accompanying drawings.

Figure 1:
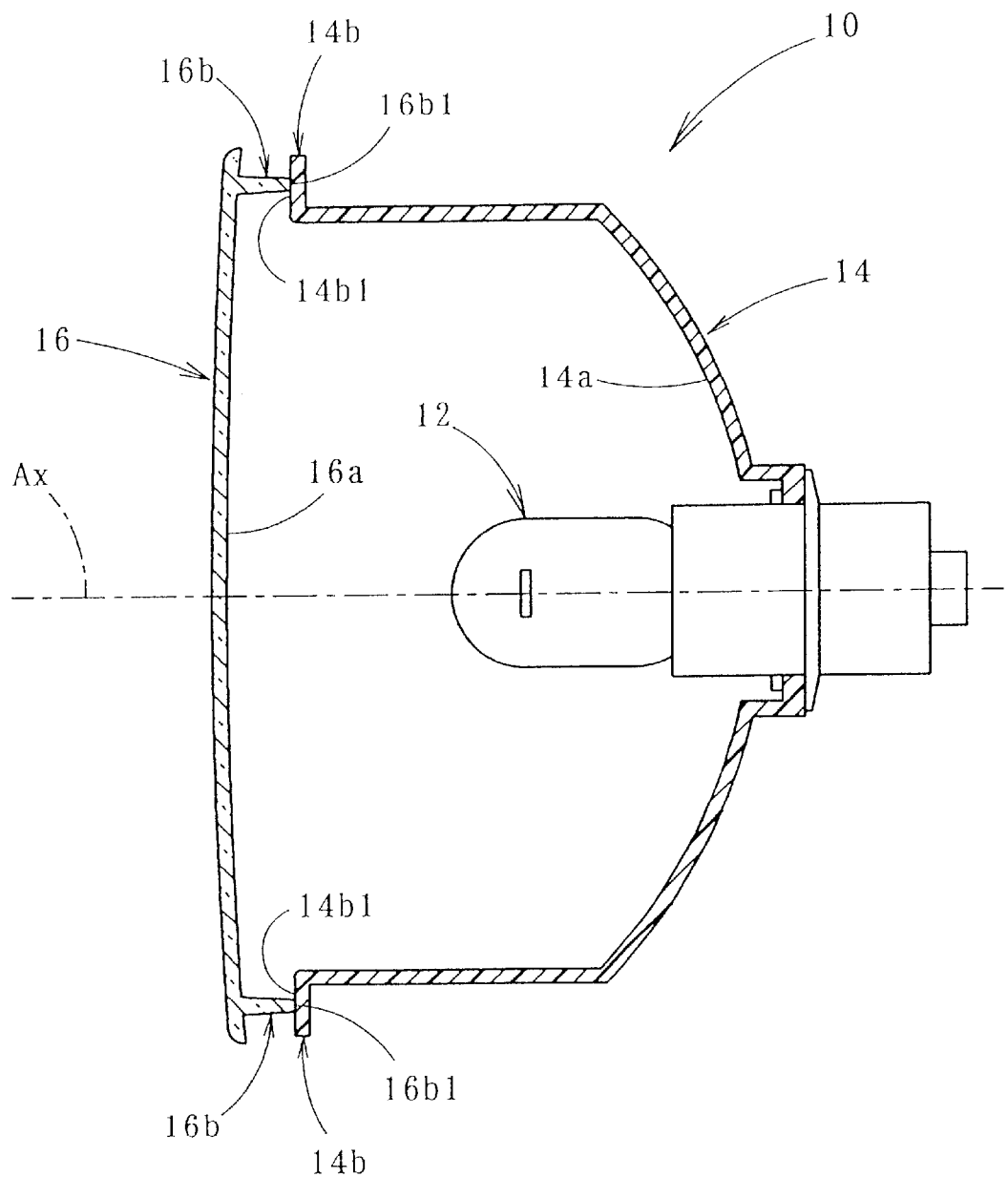
FIG. 1 is a side sectional view showing a vehicular lamp constructed according to a preferred embodiment of the present invention.

FIG. 1 is a side sectional view showing a vehicular lamp according to the present invention.

As shown in the drawing, a vehicular lamp 10 constructed according to the present invention is provided in the form of an indicator lamp such as a tail lamp. The lamp 10 includes a lamp body 14 with a light source bulb 12 mounted therein on a lamp reference axis Ax extending in the longitudinal direction, and a front lens 16 joined to the front end opening of the lamp body 14. The lamp 10 is structured so as to reflect light from the light source bulb 12 forward, diffusing and deflecting it with a reflective surface 14a formed on the lamp body 14.

The front lens 16 is a transparent lens formed by a clear thermoplastic resin material such as PMMA(poly methyl methacrylate) or PC(polycarbonate). A sealing leg 16b which protrudes to the rear is formed around the entire outer periphery of the rear surface 16a of the front lens 16. The tip face 16b1 of the sealing leg 16b is planar.

The lamp body 14 is formed of a non-transparent thermoplastic resin material such as ASA(Acrylonitrile styrene acrylate) or ABS. At the front end opening of the lamp body 14, a flange portion 14b that extends generally perpendicular to the lamp reference axis Ax is formed. The front face of the flange portion 14b constitutes a receiving face 14b1 which abuts the tip face 16b1 of the sealing leg 16b.

The front lens 16 and the lamp body 14 are joined by laser welding the tip face 16b1 of the sealing leg 16b and the receiving face 14b1.

Figure 2:
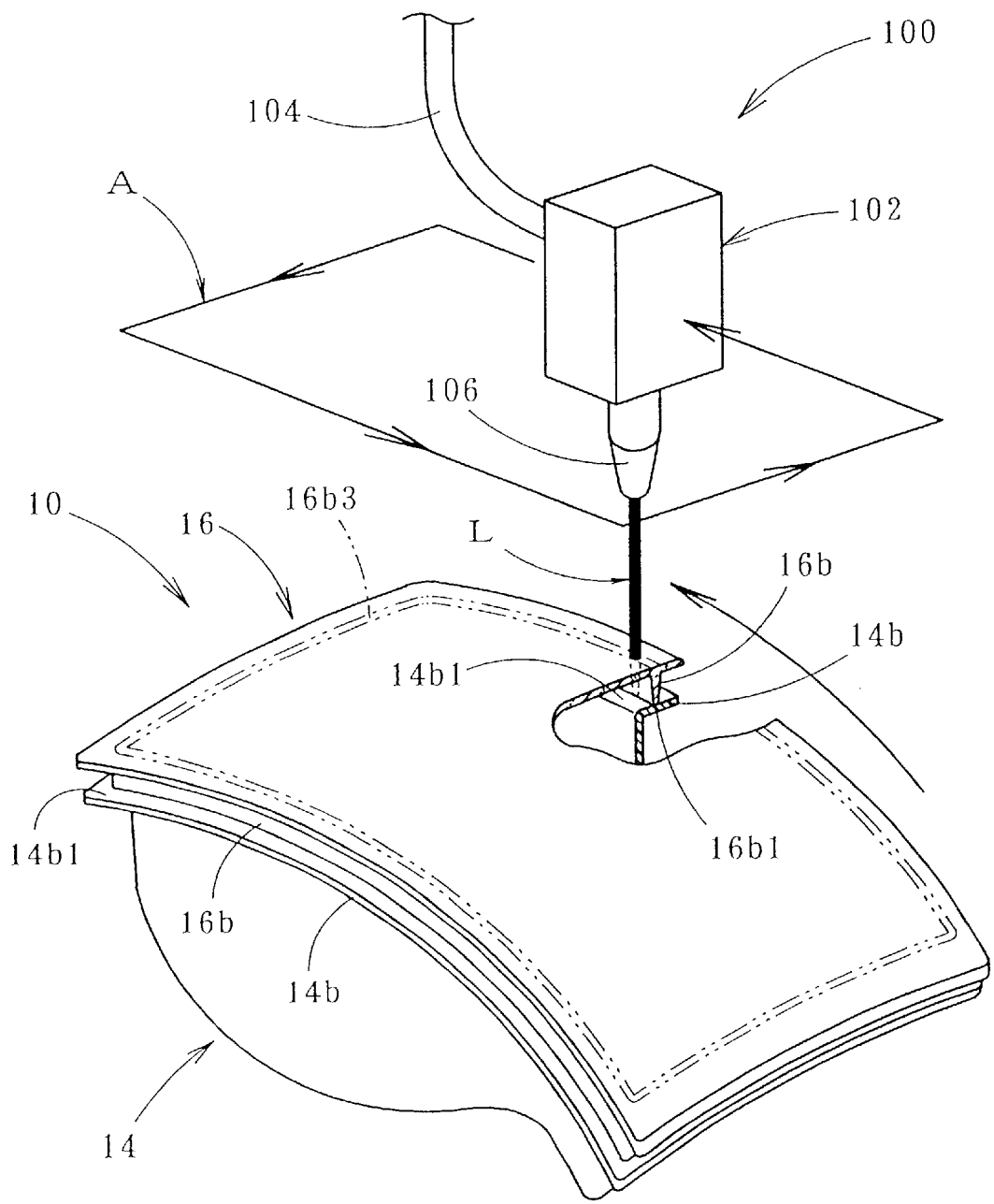
FIG. 2 is a perspective view showing processes of laser welding performed in the lamp of FIG. 1.

FIG. 2 is a perspective view illustrating the processes used in this laser welding operation.

As shown in the drawing, laser welding is performed using a laser welding robot 100 while the lamp 10 is disposed facing upward.

The laser welding robot 100 has a laser head 102 attached to the robot main body, which is not shown. At the side face of the laser head 102, a fiber cable 104 formed by housing optical fiber is attached. At the bottom face of the laser head 102, an emission head 106 is installed which supports the optical fiber in such a way that the tip face thereof is exposed facing downward. The laser head 102 emits a laser beam generated by a laser source, is which is not shown, from the emission head 106 downward in the vertical direction via the fiber cable 104. The aforementioned laser source is preferably a semiconductor laser with an output of approximately 15 to 100 W and a wavelength of approximately 0.8 to 1.5 $\mu$m.

The laser welding is performed by moving the laser head 102 in the horizontal plane, as shown with an arrow A in the drawing, such that a laser beam L emitted from the emission head 106 is irradiated to a position of a base end portion 16b3 (as shown by two-dot chain line in the drawing) of the sealing leg 16b in the front lens 16. Instead of moving the laser head 102 two-dimensionally in the horizontal plane as mentioned above, it may be moved three-dimensionally along the shape of the joint interface.

Figure 3:
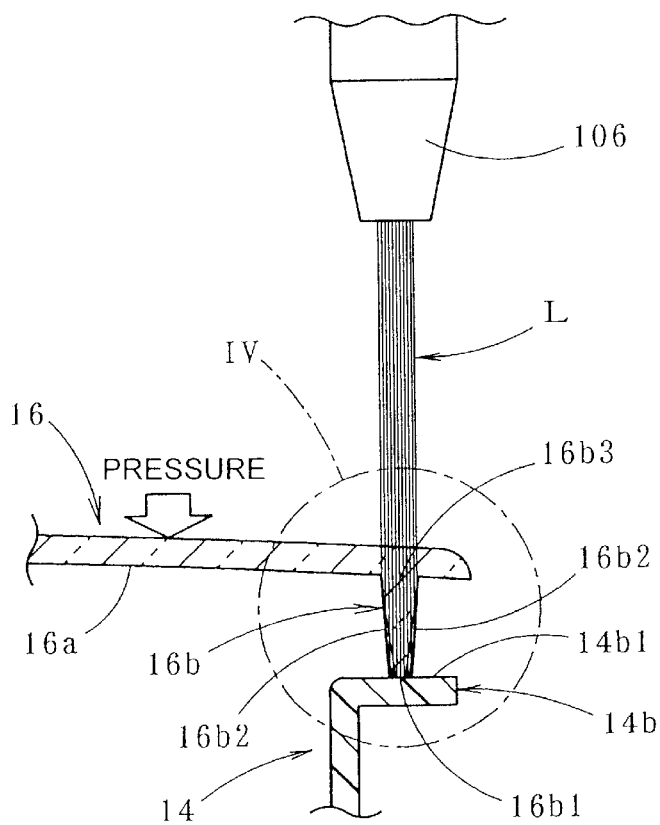
FIG. 3 is a sectional view of an essential portion of the vehicular lamp showing how the aforementioned laser welding is performed.
Figure 4:
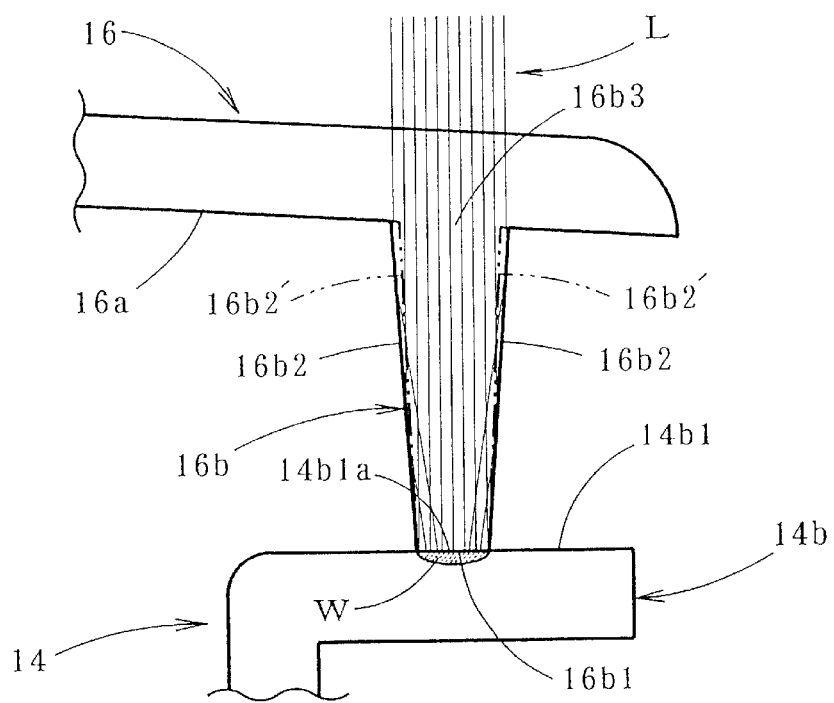
FIG. 4 is a detail view of a portion IV indicated in FIG. 3.

FIG. 3 is a sectional view of essential portions of the vehicular lamp 10 illustrating the manner in which the aforementioned laser welding operation is performed, and FIG. 4 is a detailed view of a portion IV indicated in FIG. 3.

As shown in these figures, the beam spot diameter of the laser beam L is set to be generally the same as the widthwise dimension of the base end portion 16b3 of the sealing leg 16b. The laser beam L that has entered the front lens 16 passes through the sealing leg 16b and reaches the tip face 16b1 thereof, and is irradiated to a tip face abutting portion 14b1a on the receiving face 14b1 of the lamp body 14. Accordingly, the tip face abutting portion 14b1a of the receiving face 14b1 is heated by the irradiation energy of the laser beam L and melted such that a weld portion W is formed at the tip face abutting portion 14b1a. Further, the weld heat also melts the tip face 16b1 of the sealing leg 16b to create a compatible state. At this time, by pressing the front lens 16 toward the lamp body 14, the tip face 16b1 of the sealing leg 16b and the receiving face 14b1 are tightly welded.

Employing laser welding in the manner described enables joining without the generation of large burrs or the like on either side of the joint interface of the front lens 16 and the lamp body 14. Particularly, because the front lens 16 according to the present embodiment is a transparent lens, the quality of the appearance around the joint interface is effectively improved. Also, with employment of laser welding, even in areas where the shape of the joint interface changes three-dimensionally, only the laser beam reaches the joint interface, which enables joining without difficulty, thereby ensuring a sufficient joint strength.

As shown in FIG. 4, both side faces 16b2, 16b2 of the sealing leg 16b are formed in a tapered shape. That is, the sealing leg narrows from the base end portion 16b3 to the tip face 16b1 of the sealing leg 16b at an angle (approximately 4° relative to the vertical line) greater than a general draft angle (approximately 1.5° relative to the vertical line) as shown by the two-dot chain line in the same drawing. The reason for forming the sealing leg 16b in a tapered shape as mentioned above will be described by FIG. 5, which is an enlarged view of FIG. 4.

As shown in FIG. 5(a), forming the sealing leg 16b in a is tapered shape enables a part of the ambient light on both sides of the laser beam L that has entered the front lens 16 to enter both side faces 16b 2, 16b2 of the sealing leg 16b. The ambient light is internally reflected (i.e., totally reflected) on both side faces 16b2, 16b2, which enables the laser beam L to reach the tip face 16b1 of the sealing leg 16b while increasing the energy density thereof.

In this case, as shown in FIG. 5(b), the intensity distribution of the laser beam L is generally a Gaussian distribution, as shown by the two-dot chain line. The irradiation energy density on the receiving face 14b1 is high only at the central portion along the width of the tip face 16b1. In the present embodiment, internal reflection action on both side faces 16b2, 16b2 formed in a tapered shape makes the intensity distribution of the laser beam L reaching the tip face 16b1 a generally elliptically shaped distribution. Therefore, by effectively utilizing the light of the laser beam L on the periphery of both sides, a relatively uniform irradiation energy density distribution can be obtained over the entire width of the tip face abutting portion 14b1a of the receiving face 14b1.

As described above, obtaining a relatively uniform irradiation energy density distribution over the entire width of the tip face abutting portion 14b1a of the receiving face 14b1 significantly enhances the welding strength between the tip face 16b1 of the sealing leg 16b and the receiving face 14b1. That is, if there were a portion with too low an irradiation energy density on a part of the tip face abutting portion 14b1a of the is receiving face 14b1, that portion would be insufficiently welded and a sufficient welding strength would fail to be obtained. On the other hand, if there is a portion with too high an irradiation energy density on a part of the tip face abutting portion 14b1a of the receiving face 14b1, the resin material of the lamp body 14 therein will deform and thus a sufficient welding strength again will not be obtained.

In the present embodiment, however, a relatively uniform irradiation energy density distribution is obtained over the entire width of the tip face abutting portion 14b1a of the receiving face 14b1. Therefore, by setting its value to an appropriate size, the entire width of the tip face abutting portion 14b1a can be reliably welded without deforming the resin material of the lamp body 14, thereby significantly enhancing the welding strength.

In addition, forming both side faces 16b2, 16b2 of the sealing leg 16b in a tapered shape allows the base end portion 16b3 of the sealing leg portion 16b to be made larger, even if the tip face 16b1 thereof is smaller, which facilitates irradiation of the laser beam into the sealing leg 16b.

Figure 6:
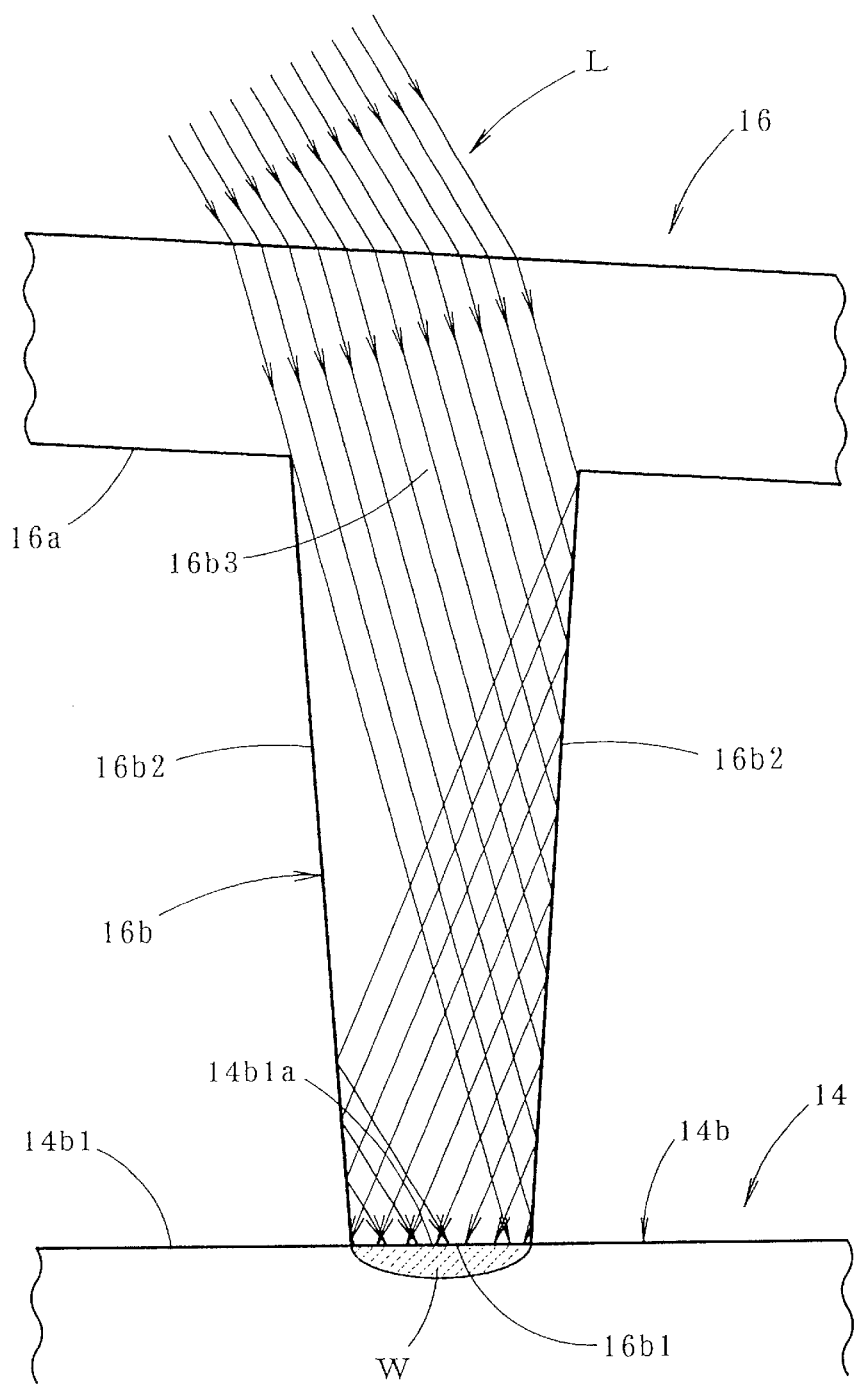
FIG. 6 is a view similar to FIG. 5 showing the state where the laser beam is diagonally irradiated.

Further, in the present embodiment, the laser beam L is irradiated from the upper side (the front side in the state where the lamp is used) to the receiving face 14b1 through the sealing leg 16b. Therefore, as shown in FIG. 6, even a laser beam L entering from a diagonal direction to some extent relative to the front lens 16 is reflected internally on both side faces 16b, 16b of the sealing leg 16 so as to reliably reach the tip face 16b1 thereof. As a result, the energy of the laser beam L is not reduced, and it is possible to efficiently heat the lamp body 14. Further, since the laser beam L is diagonally irradiated as mentioned above, laser welding can be performed merely by changing the orientation of the emission head 106 along the disposed shape of the sealing leg 16b, that is, without the need to move the laser head 102 in the horizontal plane along the shape of the sealing leg 16b, as shown by an arrow A in FIG. 2.

The front lens 16 is formed such that the tip face 16b1 of the sealing leg 16b has a planar shape. If the front lens is formed as a single unit prior to laser welding, a lens having a tip face 16b1 formed in a planar shape or having another sectional shape may also be used.

As shown in FIG. 7(a), laser welding is performed using the front lens 16 with the tip face 16b1 of the sealing leg 16b formed in a convex lens shape, thereby enabling the following effects to be obtained.

That is, as shown in FIG. 7(a), laser welding of the front lens 16 to the lamp body 14 is initiated in a state in which the central portion of the tip face 16b1 formed in a convex lens shape abuts the receiving face 14b1. At this time, the laser beam L that penetrates the sealing leg 16b and reaches the tip face 16b1 thereof is emitted by the tip face 16b1 formed in a convex lens shape to the receiving face 14b1 as a converging beam. Thus, the portion near the central portion of the receiving face 14b1 which the focusing beam enters melts first. Further, with this melting, a part of the tip face 16b1 of the sealing leg 16 is rendered into is a compatible state and sinks into the receiving face 14b1. Then, as shown in FIG. 7(b), the focusing beam enters both sides of the portion near the central portion of the receiving face 14b1, melting both sides. This melting causes a part of the tip face 16b1 of the sealing leg 161 to be rendered into a further compatible state and sink in the receiving face 14b1. Passing through the state as shown in FIG. 7(c), the portion of the tip face 16b in a convex lens shape completely disappears. Upon completion of laser welding, the sealing leg 16b and the flange portion 14b are welded together over the entire width of the tip face 16b1.

In this way, forming the weld portion W by focusing the irradiation energy of the laser beam L first on the portion near the central portion of the receiving face 14b1, and then progressively enlarging the weld portion W on both side portions thereof enables laser welding to be performed efficiently utilizing the irradiation energy of the laser beam L. Further, the required laser output can be reduced proportionally.

Also in the present embodiment, the receiving face 14b1 of the lamp body 14 has been described as being formed in a simple planar shape. However, as shown in FIG. 8, a positioning groove 14b2 to prevent displacement of the sealing leg 16b may be formed in the receiving face 14b1. The positioning groove 14b2 shown in FIG. 8(a) is formed by a pair of ribs 14b3 formed at an interval generally the same as the width of the tip face 16b1 of the sealing leg 16b, while the positioning groove 14b2 shown in FIG. 8(b) is formed in the receiving face 14b1 in a concave shape with the width generally the same as the width of the tip face 16b1 of the sealing leg 16b.

Forming the positioning groove 14b2 as described above allows laser welding to be performed while the front lens 16 and the lamp body 14 are maintained in a predetermined physical relationship. Further, even if some burrs are generated due to laser welding, they can be confined in the positioning groove 14*b* 2, thereby providing a superior appearance quality around the joint interface. The positioning groove 14*b*2 does not need to be as large as the groove for applying a seal member formed for indirect joining, thus eliminating the risk of degrading the appearance quality around the joint interface due to the presence of the positioning groove 14*b*2.

In the present embodiment, the beam spot diameter of the laser beam L is set to be generally the same as the width dimension of the base end portion 16*b*3 of the sealing leg 16*b*. However, it may also be set to be slightly larger or slightly smaller than the width dimension.

Also in the present embodiment, the sealing leg 16*b* has been described as being formed in a tapered shape. However, even when the sealing leg 16*b* is formed at an ordinary draft angle, the laser beam L which reaches the front lens 16 is also reliably able to reach the tip face 16*b*1 of the sealing leg 16*b*. As a result, the energy of the laser beam L is not reduced and it is possible to efficiently heat the lamp body 14.

In the present embodiment, the vehicular lamp 10 is described as being an indicator lamp. However, similar effects as those of the present embodiment can be obtained by employing a structure similar to the present embodiment even with other types of vehicular lamp.

It should further be apparent to those skilled in the art that various changes in form and detail of the invention as shown and described above may be made. It is intended that such changes be included within the spirit and scope of the claims appended hereto.

What is claimed is:

1. A vehicular lamp comprising: a front lens and a lamp body; a sealing leg being formed on said front lens and a receiving face, against which a tip face of said sealing leg abuts, being formed on said lamp body; and said tip face of said sealing leg and said receiving face being joined by laser welding.

2. A vehicular lamp according to claim 1, wherein both side faces of said sealing leg are formed in a tapered shape.

3. A vehicular lamp according to claim 1, wherein a positioning groove for preventing displacement of said sealing leg is formed in said receiving face.

4. A vehicular lamp according to claim 2, wherein a positioning groove for preventing displacement of said sealing leg is formed in said receiving face.

5. A vehicular lamp according to claim 1, wherein said tip face of said sealing leg is formed so as to have a convex-lens-shaped cross-section.

6. A vehicular lamp according to claim 1, wherein the sealing leg is protruded to the rear of said front lens, and a laser beam entering the front lens passes through said sealing leg and reaches the tip face.

7. A vehicular lamp comprising: a front lens; a lamp body; a sealing leg being formed on said front lens; and a receiving face, against which a tip face of said sealing leg abuts, being formed on said lamp body, wherein said tip face of said sealing leg and said receiving face have been joined directly to each other by laser welding.

8. A vehicular lamp comprising: a front lens; a lamp body; a sealing leg being formed on said front lens; a receiving face, against which a tip face of said sealing leg abuts, being formed on said lamp body, and a weld portion connecting said tip face of said sealing leg and said receiving face;

wherein said weld portion has been formed by laser welding.

* * * * *